United States Patent [19]

Lee

[11] Patent Number: 4,738,860
[45] Date of Patent: Apr. 19, 1988

[54] PROCESS FOR REMOVING SKINS FROM SHELLED WALNUTS

[75] Inventor: Edward P. Lee, Hacienda Heights, Calif.

[73] Assignee: Penutech, City of Industry, Calif.

[21] Appl. No.: 908,630

[22] Filed: Sep. 18, 1986

[51] Int. Cl.⁴ .............................................. A23P 1/00
[52] U.S. Cl. .................................... 426/482; 426/507
[58] Field of Search ...................... 426/482, 507, 288

[56] References Cited

U.S. PATENT DOCUMENTS

| | | | |
|---|---|---|---|
| 1,367,664 | 2/1921 | Kennedy | 99/584 |
| 1,717,647 | 6/1929 | Barody | 99/584 |
| 1,887,256 | 11/1932 | Bizzell | 426/288 |
| 2,329,403 | 9/1943 | Logue | 426/482 |
| 2,651,345 | 9/1953 | Schoolcraft | 426/482 |
| 3,077,217 | 2/1963 | Hind | 426/482 |
| 4,082,867 | 4/1978 | Henley et al. | 134/40 |

Primary Examiner—George Yeung
Attorney, Agent, or Firm—Ladas & Parry

[57] ABSTRACT

The method and apparatus for removing the skins of shelled walnuts generally involves confining the shelled walnuts in a containment area, spraying the walnuts with water under sufficient pressure to remove the skins without breaking the nuts, removing excess water from the skinned walnuts and skins, and separating the walnuts from the skins. The apparatus generally includes one or more nets for confining the shelled walnuts in a containment area, one or more spray nozzles directed at the walnuts, and one or more pumps providing water under pressure to the nozzles.

15 Claims, 2 Drawing Sheets

PROCESS FOR REMOVING SKINS FROM SHELLED WALNUTS

BACKGROUND OF THE INVENTION

1. Field of the Invention

This invention is directed to a process and apparatus for removing the skins from the nut meat of shelled walnuts. More particularly, the method and apparatus of the invention allow the removal of the brown, thin, poor tasting skins from the nut meat of shelled walnuts, substantially without waste or breakage of the nut meat.

2. Prior Art

As is well known, the skins or pellicles of nuts found beneath the shells of the nuts, is often bitter, and detracts from the appearance and flavor of nuts in prepared foods or when eaten separately. It has been known to remove the skin of regularly shaped, rounded nuts by the use of jets of water on the nuts while the nuts are agitated, but the removal of the skins from shelled walnuts has generally been practiced by removal of the skins by hand, or by treatment in harsh solutions, or a combination of such practices, in order to avoid wasteful breakage of the nut meat, which occurs as a consequence of the highly irregular and convoluted of the nut meat, which makes removal of the skin an exceedingly difficult and painstaking process. Although the removal of skins from shelled walnuts has been practiced for centuries to produce an expensive delicacy for use in the preparation of various food dishes, the applicant is not aware of any known process or apparatus which allows for the removal of walnut skins in quantity, without substantial breakage of the nut meat, as is provided for by the process and apparatus of the present invention.

SUMMARY OF THE INVENTION

This invention is directed to a method and apparatus for removing the skins of shelled walnuts in quantity, and without substantial breakage of the nut meat, which lends itself to mass production of high quality skinned and shelled walnuts. The process for removing the skins from the nut meat of shelled walnuts basically comprises confining the shelled walnuts to a containment area; spraying the shelled walnuts in the containment area with water under sufficient pressure to remove the skins without breaking the nuts; removing excess water from the skinned walnuts and skins; and separating the skinned walnuts from the skins. The principal features of the apparatus for removing the skins from the nut meat of shelled walnuts comprise basically a means for confining the shelled walnuts to the containment area for spraying; a means for spraying the shelled walnuts in the containment with water at a sufficient pressure to remove the skins without breaking the nuts; a pump to provide water at an elevated pressure to the means for spraying the shelled walnuts, and a means for connecting the pump to the spray means.

It is an object of the invention to provide a method for removing the skins from shelled walnuts substantially without any breakage of the nut meat. It is also an object of the invention to provide an economical process for mass production of high quality shelled, skinned walnuts.

It is a further object of the invention to provide for an apparatus for removing the skins from the nut meat of shelled walnuts which will lend itself to mass production of high quality skinned walnuts, without substantial breakage of the nut meat.

These and other objects and advantages of the invention will become apparent from the drawings and description of the invention which follows.

DESCRIPTION OF THE DRAWINGS

The following is a description of the drawings of a preferred embodiment of the present invention.

DETAILED DESCRIPTION OF THE INVENTION

Figure 1:
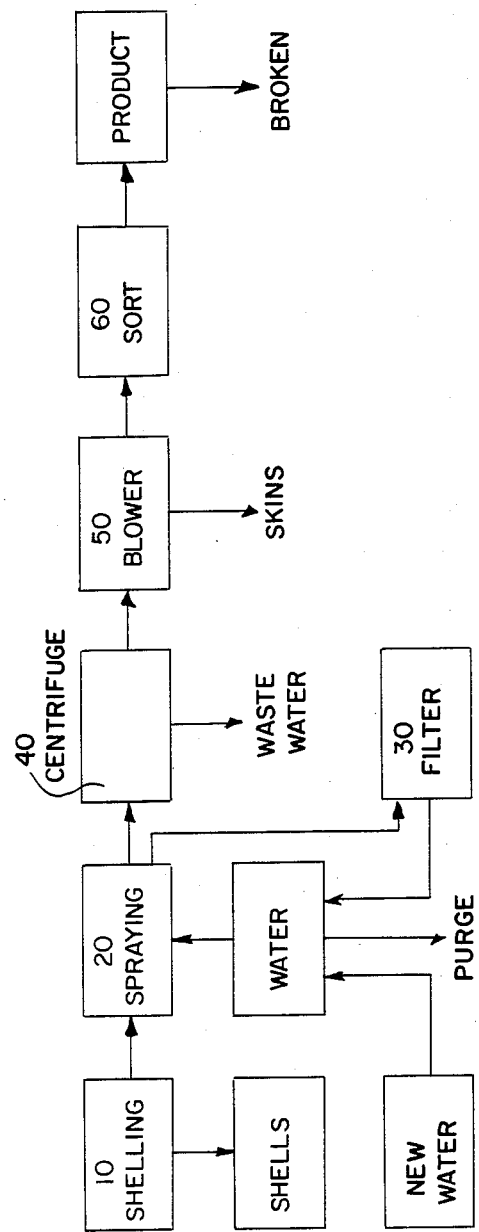
FIG. 1 is a schematic diagram of the steps of the process according to the invention.

A preferred method of practicing the invention is depicted in the schematic diagram of FIG. 1. The process as shown includes the step of shelling the walnuts at 10, but this step is not essential to the present process, since shelled walnuts are widely available commercially. The shelled walnuts are subjected to the step of spraying at 20, in order to remove the skins from the nut meat. The skinned walnuts and the skins are then taken to a centrifuge at 40 for removal of excess water. Thereafter, the skins and nut meat may be separated by means of an air blower at 50, after which the skins may be discarded, and the resulting nut meat may be sorted at 60 to separate the high quality skinned nut meat from any remaining skins and broken walnut pieces that there may be. Although it is not essential that the water from the spraying step be recycled, it is more economical to provide for recycling of the water, with filtration of the water at 30 before reuse, and with an occasional purging of the water and addition of fresh water to the cycle. Waste water from the centrifugation step at 40 may be simply discarded, and any water lost can be easily replaced in the course of normal maintenance of the water in the spraying cycle.

It has been found that it is possible to remove the skins from shelled walnuts by spraying the shelled walnuts with a stream of water under pressure, while the shelled walnuts are confined to a containment area. The shelled walnuts are in the preferred method and apparatus of the invention contained in a loosely cupped fine mesh fabric net or screen, which will allow the shelled walnuts to move freely within the containment area while being sprayed with the high pressure stream of water. The water is preferably sprayed in a narrow stream or jet at a pressure of from 20 psi to 150 psi at the spray nozzle, and most preferably from 30 to 100 psi at the spray nozzle. A flow rate which has been found to be convenient and practical in the current practice of the invention has been 1.3 gallons per minute for each spray nozzle at 30 psi. Also, preferably the diameter of the jet or stream of the spray is between $\frac{1}{8}$ to $\frac{1}{4}$ of an inch. It has been found practical and convenient to keep the distance of the walnuts from the nozzles at about 1 foot, in order to avoid excessive spreading of the jets or streams.

In addition to removal of excess water by centrifugation, during the separation of the skinned walnuts from the skins by blowing air over the skins and walnuts, the skinned walnuts may be further dried by heating the air blown over the skins and walnuts.

Figure 2:
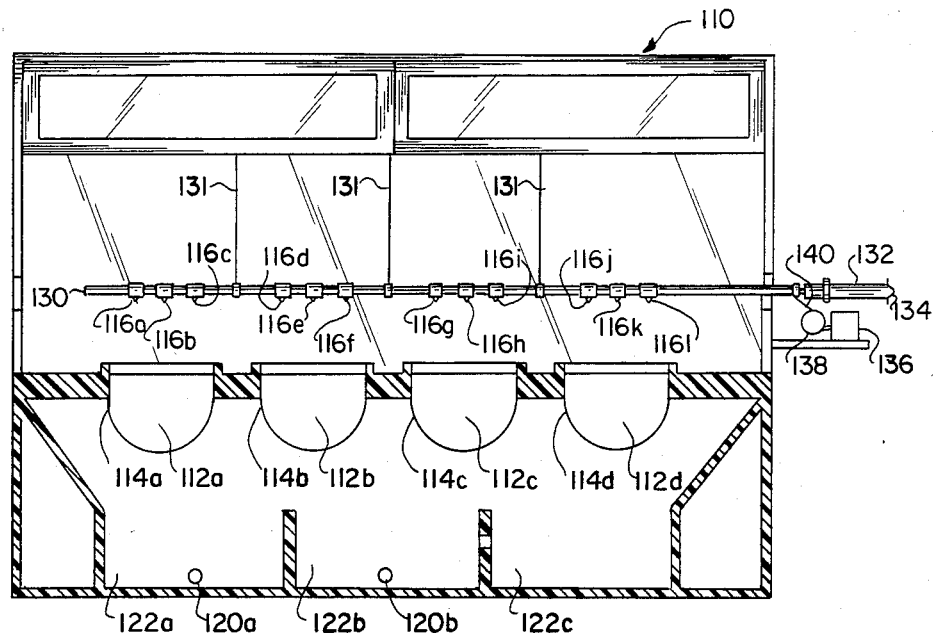
FIG. 2 is a front view of a preferred construction of the apparatus of the invention.
Figure 3:
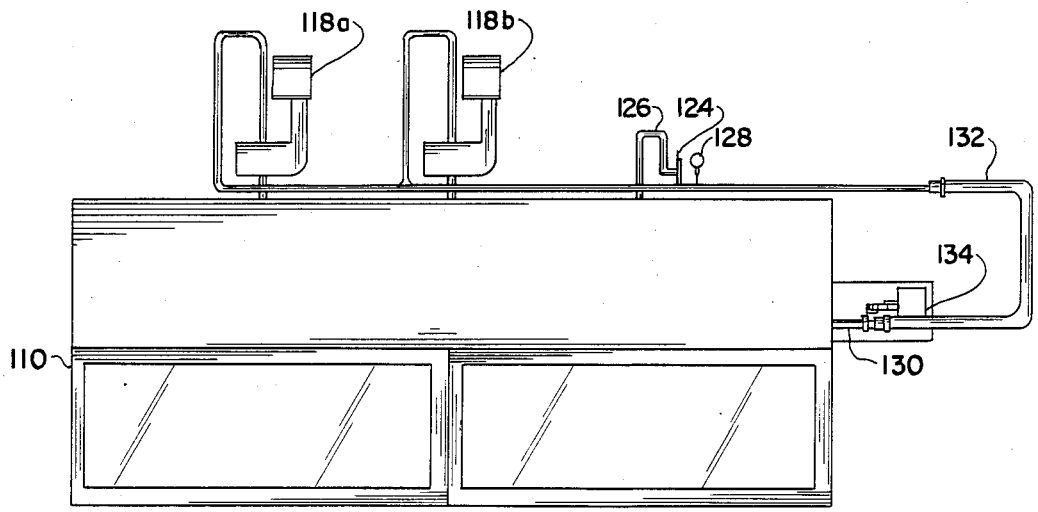
FIG. 3 is a top plan view of the structure according to FIG. 2.

As shown in FIGS. 2 and 3, the apparatus generally includes a housing 110, providing containment areas 112a, b, c, and d, having the loose fine mesh fabric nets or screens 114a, b, c, d, mounted therein for containment of the shelled walnuts rather loosely in the cup shaped area. Four containment areas are shown in the drawings, as it is presently preferred to provide for a plurality of spraying areas. Accordingly, there are preferably a plurality of corresponding sets of nozzles for each of the containment areas, here referred to as nozzles 116a through l. The nozzles are mounted on a pipe 130, which is connected to one or more pumps, shown in the drawings as pumps 118a, b, by way of a flexible hose 132. Water from the spray nozzles passes through the nets in the containment areas and into catch basins 122a, b, and c below the containment areas, after which the water is returned to the pumps for recycling through inlet 120a and b. Preferably, there is a pressure relief valve 124 connected between the pumps 118a, b, and flexible hose, and a connection 126 of the relief valve to the catch basins, such as catch basin 122c, for water to be returned to the cycle from the relief valve. A pressure regulator 128 is also preferably mounted between the pressure relief valve and the flexible hose 132.

In addition, in the preferred mode of the apparatus, the spray nozzle pipe is mounted at 131 to the housing 110, to permit the spray nozzle pipe to reciprocate along its longitudinal axis to permit the nozzles on the pipe to spray back and forth across the shelled walnuts. The means for reciprocating the spray pipe along its longitudinal axis is shown in the drawings as including a reciprocating motor 134 mounted on the housing, having a piston rod 136 connected to a cam wheel 138, connected by connecting rod 140 to the spray nozzle pipe, thereby to cause reciprocation of the spray nozzle pipe as the cam wheel turns. Other means for permitting the reciprocation of the spray nozzle pipe are known in the art and would likely be suitable alternatives.

A different configuration of the spray from the nozzles may also be possible, with a corresponding increase or decrease in pressure and flow from the nozzles, but it has been found with the configuration of a narrow stream or jet as discussed above that a water pressure of more than 300 psi causes increased breakage of the nut meat, and consequent waste. Fine adjustments of the stream or jet to obtain optimum results at operating water pressures may be facilitated by using adjustable nozzles.

The invention having been described in its preferred and alternative embodiments, it is clear that numerous modifications anud embodiments are within the ability of those skilled in the art, and various changes in form and detail of the process and apparatus may be made without departing from the spirit and scope of the invention.

I claim:

1. A process for removing the skins from nut meat of shelled walnuts comprising:
   (a) confining said shelled walnuts to a cupped-shaped containment vessel;
   (b) spraying the shelled walnuts in said containment vessel with water under sufficient pressure to remove the skins without breaking the nuts;
   (c) removing excess water from the skinned walnuts and skins; and
   (d) separating the skinned walnuts from the skins.

2. The process of claim 1, wherein said shelled walnuts are sprayed with water at a pressure of from 20 psi to 150 psi.

3. The process of claim 1, wherein said shelled walnuts are sprayed with water at a pressure of from 30 to 100 psi.

4. The process of claim 1, wherein said shelled walnuts are sprayed with water at a flow rate of 1.3 gal/min at 30 psi.

5. The process of claim 1, wherein said water is sprayed in a stream having a diameter of from $\frac{1}{8}$ to $\frac{1}{4}$ inch.

6. The process of claim 1, wherein said water is sprayed at a distance of about 1 foot from said shelled walnuts.

7. The process of claim 1, further including the step of recycling the water sprayed on said shelled walnuts for reuse in spraying said shelled walnuts.

8. The process of claim 7, wherein the water sprayed on said shelled walnuts is filtered before being reused in spraying said shelled walnuts.

9. The process of claim 1, wherein said excess water is removed from said skinned walnuts and said removed skins by centrifugation.

10. The process of claim 1, wherein said skins are removed from said skinned walnuts by blowing air over said skins and said skinned walnuts.

11. A method for removing the skins from nut meat of shelled walnuts comprising:
    (a) placing a plurality of shelled walnuts in a generally cupped-shaped vessel, the vessel including fine mesh means for holding said walnuts, but permitting water to pass therethrough; and
    (b) directing at least one stream of water to an open side of said generally cupped-shaped vessel, the stream of water being of sufficient force to cause said walnuts to move within said vessel and shed their skins and passing through said mesh means.

12. The method of claim 11, wherein said shelled walnuts move freely within said vessel while being sprayed with the at least one stream of water.

13. The method of claim 11, wherein said at least one stream of water is precipitated along a direction which is disposed at generally a right angle to a major axis of said vessel.

14. The method of claim 11, wherein said shelled walnuts are sprayed with water at a pressure of 30 to 100 psi.

15. The method of claim 14, wherein said water is sprayed at a distance of approximately one foot from said shelled walnuts when disposed in said vessel.

* * * * *